United States Patent
Kohli

(10) Patent No.: US 8,316,008 B1
(45) Date of Patent: Nov. 20, 2012

(54) FAST FILE ATTRIBUTE SEARCH

(75) Inventor: Jaspal Kohli, Sunnyvale, CA (US)

(73) Assignee: Mirapoint Software, Inc., San Mateo, CA (US)

( * ) Notice: Subject to any disclaimer, the term of this patent is extended or adjusted under 35 U.S.C. 154(b) by 31 days.

(21) Appl. No.: 11/279,855

(22) Filed: Apr. 14, 2006

(51) Int. Cl.
*G06F 7/00* (2006.01)
*G06F 17/30* (2006.01)

(52) U.S. Cl. ........................................................ 707/711

(58) Field of Classification Search .................... 707/711
See application file for complete search history.

(56) References Cited

U.S. PATENT DOCUMENTS

| | | | |
|---|---|---|---|
| 5,577,226 A | 11/1996 | Percival | |
| 5,606,681 A | 2/1997 | Smith et al. | |
| 5,765,165 A * | 6/1998 | Harper .................................. | 1/1 |
| 5,974,414 A | 10/1999 | Stanczak et al. | |
| 5,978,452 A | 11/1999 | Cho | |
| 6,185,569 B1 * | 2/2001 | East et al. ............................ | 1/1 |
| 6,275,848 B1 | 8/2001 | Arnold | |
| 6,396,907 B1 | 5/2002 | Didcock et al. | |
| 6,631,399 B1 | 10/2003 | Stanczak et al. | |
| 6,684,308 B2 | 1/2004 | McNeil | |
| 6,751,667 B1 | 6/2004 | Helliwell | |
| 6,757,712 B1 | 6/2004 | Bastian et al. | |
| 6,785,712 B1 | 8/2004 | Hogan et al. | |
| 6,829,617 B2 * | 12/2004 | Sawdon et al. ....................... | 1/1 |
| 6,847,984 B1 | 1/2005 | Midgley et al. | |
| 7,003,551 B2 | 2/2006 | Malik | |
| 7,293,033 B1 * | 11/2007 | Tormasov et al. ............ | 707/608 |
| 7,487,212 B2 | 2/2009 | Taylor | |
| 2002/0016818 A1 | 2/2002 | Kirani et al. | |
| 2002/0184317 A1 * | 12/2002 | Thankachan .................. | 709/206 |
| 2003/0061269 A1 | 3/2003 | Hathaway et al. | |
| 2003/0135522 A1 * | 7/2003 | Doyle et al. ................... | 707/200 |
| 2004/0267838 A1 | 12/2004 | Curran et al. | |
| 2005/0033748 A1 * | 2/2005 | Kazar et al. ..................... | 707/10 |

FOREIGN PATENT DOCUMENTS

EP  1 349 088 A2  10/2003

OTHER PUBLICATIONS

Emma et al. "Exclusive Use Directory and Inode Caching," IP.COM, Dec. 1, 1989, 2 pages.
U.S. Appl. No. 12/344,123, filed Dec. 24, 2008, Taylor, Bradley.
U.S. Appl. No. 12/365,111, filed Feb. 3, 2009, Taylor, Bradley.
Process Software, LLC: "PMDF System Manager's Guide", Order No. N-5301-61-NN-N, 'Online! Sep. 2001, pp. 33-1-33-7.

(Continued)

*Primary Examiner* — Van Oberly
(74) *Attorney, Agent, or Firm* — Rader Fishman & Grauer

(57) ABSTRACT

A method of performing a file search with specified attribute criteria includes generating or having access to a file system image of the data storage system. A substantially sequential scan of the file system image can then be performed. Based on the scan, a list of inodes (called a specified criteria inode map) on the file system image that have the specified attribute criteria can be built. This sequential scan eliminates the random scan of the file system image, thereby dramatically reducing the total time associated with reading of the inodes. A file tree of the data storage system can then be walked to find inodes (in the file tree) that match inodes in the specified criteria inode map. A list of files that correspond to matching inodes can thus be quickly and easily generated.

17 Claims, 5 Drawing Sheets

OTHER PUBLICATIONS

Superspeed Software Inc.: "Increasing performance in the Mission Critical Envirmonment", White Paper, 'Online!, Nov. 29, 2001, pp. 1-12.
Postel J.B.: "Simple Mail Transfer Protocol", Internet Specification RFC, RFC 821, Aug. 1982, pp. 1-68.
International Search Report PCT/GB02/05618 dated Oct. 7, 2003.
Co-pending U.S. Appl. No. 10/022,325, filed Dec. 14, 2001.
Notice of Allowance Mailed Oct. 3, 2008 in Co-pending U.S. Appl. No. 10/022,325, filed Dec. 14, 2001.
Non-Final Office Action Mailed Jun. 12, 2008 in Co-pending U.S. Appl. No. 10/022,325, filed Dec. 14, 2001.
Final Office Action Mailed Oct. 31, 2007 in Co-pending U.S. Appl. No. 10/022,325, filed Dec. 14, 2001.
Non-Final Office Action Mailed May 4, 2007 in Co-pending U.S. Appl. No. 10/022,325, filed Dec. 14, 2001.
Advisory Action Mailed Jan. 17, 2007 in Co-pending U.S. Appl. No. 10/022,325, filed Dec. 14, 2001.
Final Office Action Mailed Aug. 14, 2006 in Co-pending U.S. Appl. No. 10/022,325, filed Dec. 14, 2001.
Non-Final Office Action Mailed Oct. 7, 2005 in Co-pending U.S. Appl. No. 10/022,325, filed Dec. 14, 2001.
Co-pending U.S. Appl. No. 12/344,123, filed Dec. 24, 2008.
Co-pending U.S. Appl. No. 12/365,111, filed Feb. 3, 2009.
Non-Final Office Action Mailed May 14, 2010 in Co-pending U.S. Appl. No. 12/365,111, filed Feb. 3, 2009.

* cited by examiner

__US 8,316,008 B1__

FAST FILE ATTRIBUTE SEARCH

BACKGROUND OF THE INVENTION

1. Field of Invention

The present invention relates to searching for files that match a specified set of attribute criteria in a data storage system. Exemplary attribute criteria could include file modification time, size, ownership, and permissions.

2. Description of Related Art

Accessing files in large data storage systems can be very time consuming. For example, consider a ubiquitous data storage system that includes a magnetic disk drive. This disk drive can include a rotating magnetic platter that has a read/write head suspended above the platter. Thus, two latencies are associated with reading this disk drive, i.e. a first latency to spin the platter to the correct location and a second latency to reposition the head (and move to a different track).

For this reason, the read time associated with a particular file is dependent on the location of the last read file on the disk drive. That is, if the two files are closely located on the disk drive, then the read time of the second file is relatively short. On the other hand, if the two files are remotely located on the disk drive, then the read time of the second file is relatively long.

In a typical disk drive, files are initially generated based on their location in the naming hierarchy. However, as files are modified or deleted, the order of the files is increasingly dependent on the available space on the disk drive. Moreover, large files may need to be divided into multiple files that are stored in different locations.

A data storage system must store references to all files to facilitate writing to and reading each file. These references include meta data structures called identification nodes (inodes). Notably, each file has an associated inode.

FIG. 1 illustrates a simplified inode 100 that identifies its inode number 101 and includes meta data 102 as well as a disk address 103. Meta data 102 can include a plurality of file attributes, e.g. last modification time, file size, ownership, and permissions. Disk address 103 identifies the physical location of a data block in disk drive 105. This data block includes the file corresponding to inode 100. In this example, disk address 103 identifies a data block 104.

Logically, after these inodes are created, then references to such inodes must also be generated. A conventional data storage system uses a user directory to map file names to inode numbers. FIG. 2 illustrates a simplified user directory 201 including a plurality of file records 202-204. Note that a directory is a special type of file that uses the same structure described in FIG. 1 to store the list of records it contains. An exemplary file record 202 includes a file name 205 and an inode number 206. Note that an inode number refers to only one inode.

Although each file has only one inode number (and thus only one inode), it is possible that a file can have multiple names. For example, consider a data storage system for email, wherein each received email generates a file associated with a recipient. In this data storage system, if an email is sent to multiple users, e.g. Bob and Susan, then that email may be named "1." for Bob, thereby indicating that this is the first email for Bob during a predetermined time period. In contrast, that same email may be labeled "6." for Susan, thereby indicating that this is the sixth email for Susan during the same predetermined time period. However, because the email sent to both Bob and Susan is identical, only one inode number (and thus only one inode) need be saved in the data storage system.

A conventional data storage system uses a "file tree" to organize user directories. FIG. 3 illustrates a file tree 300 (also called a naming hierarchy in the data storage industry). A first level of file tree 300, i.e. level 301, includes a high-level directory (i.e. "/"). Level 301 is also called a "root" in the tree hierarchy. In a typical embodiment of a UNIX filesystem, this high-level directory has an inode number "2" (i.e. "0" and "1" are not used).

A second level of file tree 300, i.e. level 302, includes user directories. In this case, three user directories are shown: Bob's directory (i.e. "A"), Susan's directory (i.e. "B"), and Pat's directory (i.e. "C"). Note that each user directory also has an inode number that was generated when that user directory was created. Thus, user directory "A" could have an inode number "20" whereas user directory "B" could have an inode number "120". Each user directory in level 302 is called a branch in the naming hierarchy.

A third level of file tree 300, i.e. level 303, includes files within a user directory. In this embodiment, user directory A includes file names a., b., and c.; user directory B includes file names 1., 2., 3., 4., 5., and 6.; and user directory C includes file names a. and b. Note that the names of files and a user directory may be specified by the user or an application using any supported character set. In either case, the naming convention is consistent for each user directory. As indicated above, files with different names (e.g. /A/a. for Bob and /B/6. for Susan) may have the same inode number. The file names used in file tree 300 are typical in an email storage system that uses system-generated names (as opposed to user-assigned names). Each file in level 303 is called a "leaf" in the tree hierarchy.

Note that file tree 300 is representative only. The actual format of file tree 300 in a data storage system would typically conform to that shown in FIG. 2. For example, a directory at the root level can be similarly shown with user directories being shown as records. Thus, each record in file tree 300 (i.e. at levels 301, 302, and 303) would also include an inode number, which is not shown for simplicity in FIG. 3.

One typical access in a data storage system is requesting to see all files that were created since a certain time/date. In the context of an email storage system, the request might be for all email that came since yesterday. In UNIX filesystems, the "find" utility tool can implement this request.

In a conventional implementation, the search begins at level 301 and then walks down each branch at level 302 to the leaves at level 303. Specifically, a scan can be performed based on the order of records in the high level and user level directories. For example, assuming that the order of records in the high level directory is "A", "B", and "C", then "A" and each of its constituent files (e.g. "a.", "b.", and "c.") would be scanned first, then "B" and each of its constituent files (e.g. "1.", "2.", "3.", "4.", "5.", and "6.") would be scanned second, and "C" and each of its constituent files (e.g. "a." and "b.") would be scanned third. The above-referenced scanning includes looking at the inode of each entry to determine if the modification time (stored as meta data in the inode) is greater than yesterday's date.

Both system size and inode locations can adversely impact the access time of inodes. Specifically, many data storage systems are increasingly storing huge amounts of data. For example, a typical email storage system could include 100 million inodes and even more names.

Unfortunately, the conventional technique of walking this huge file tree, fetching the appropriate attribute for each entry in the file tree, and then comparing that attribute with the specified criteria results in an essentially random access of inodes on the disk drive. Note that inodes are typically scattered in chunks throughout a disk drive (e.g. a typical organization could have 8,000 inode in a 64 MB chunk). Thus, a walk of the file tree in a large data storage system is a non-scalable implementation. For example, the above-described email storage system could run for hours to implement a simple modification time request.

Therefore, a need arises for a file search technique that scales well to large data storage systems.

SUMMARY OF THE INVENTION

A method of performing a file search with specified attribute criteria in a data storage system is described. This method can generate a file system image of the data storage system. This file system image is essentially a snapshot of the data storage system at a particular point in time. At this point, a substantially sequential scan of the inodes in the file system image can be performed.

Based on the scan, a list of inodes on the file system image that have a specified attribute criteria can be built. One organization of this list (also called a specified attribute inode map herein) is to have a bitmap where each inode is represented by a bit indexed by its inode number. The specified attribute criteria can include at least one meta data attribute, e.g. modification time, ownership, file size, permissions, and combinations of these meta data attributes. A file tree of the data storage system can then be walked to find inodes (in the file tree) that match inodes in the list. A list of files that correspond to matching inodes can then be generated.

Thus, in summary, the inodes matching the specified attribute criteria can be advantageously identified by a sequential scan of the file system image (or, in another embodiment, the actual data storage system). This sequential scan eliminates the random scan of the file system image, thereby dramatically reducing the total time associated with reading of the inodes. Once the specified attribute inode map is generated, the subsequent walk of the file tree is simply determining a match of the inodes on the specified attribute inode map and the inodes of the file tree.

DETAILED DESCRIPTION OF THE FIGURES

Figure 4:
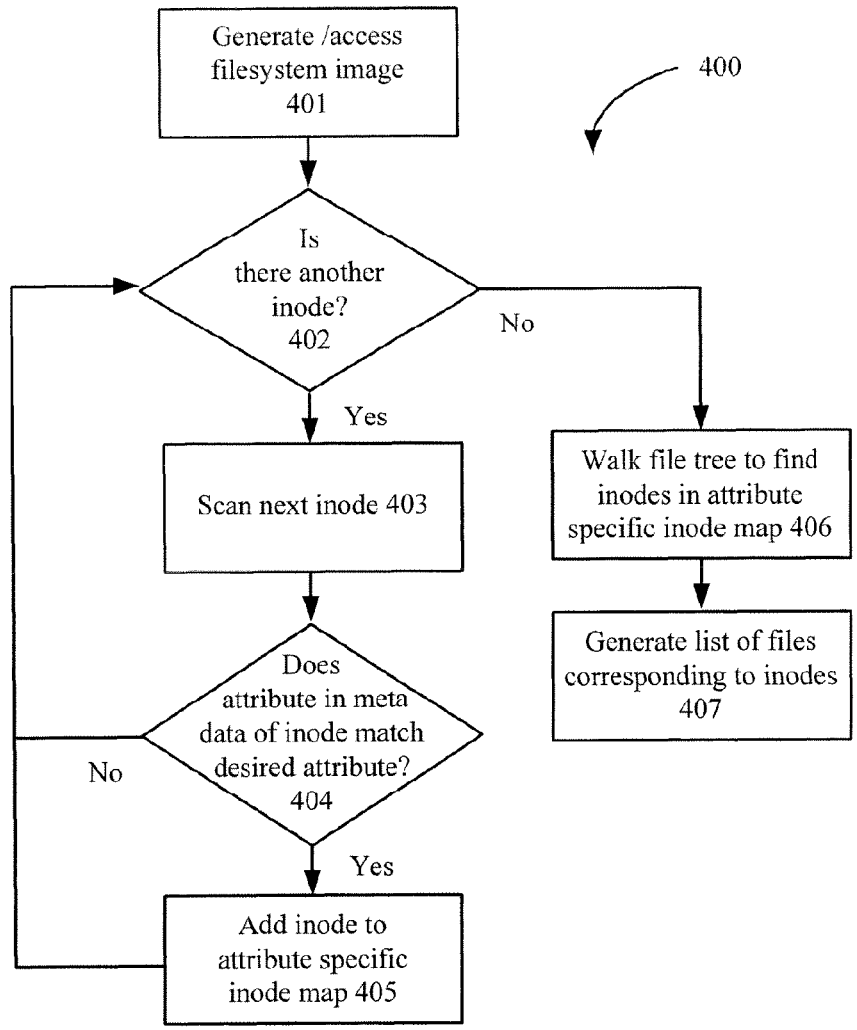
FIG. 4 illustrates a search technique that can significantly decrease the time needed to perform a search request even with large file systems.

FIG. 4 illustrates a search technique 400 that can significantly decrease the time needed to perform a search request even with large data storage systems. Step 401 generates or accesses a file system image. Note that an active disk drive is typically in a constant state of flux with files and inodes being constantly changed. The file system image is effectively a snapshot in time of the disk drive and shows all the information stored on the disk drive. This file system image can be kept as a separate logical volume.

In one embodiment, the disk drive itself (instead of the file system image) can be used. (That is, step 401 is optional.) Thus, the remaining steps of search technique 400 that apply to the file system image (i.e. steps 402, 403, 404, and 406) can be equally applied to the disk drive. For simplicity, reference is made only to the file system image in such steps of search technique 400.

Step 402 can determine whether there is another inode to be analyzed in the file system image. If so, then step 403 can scan (i.e. read) the next inode. Step 404 can determine whether an attribute in the meta data of that inode matches the desired attribute (for example, modification time, ownership, etc.). If so, then step 405 can add that inode to an attribute specific inode map. At this point, search technique 400 can return to step 402 to determine if there is another inode in the file system image to analyze. After all inodes have been analyzed, as determined in step 402, step 406 can walk the file tree to find the inodes in an attribute specific inode map. The matching inodes in the file tree will advantageously identify their corresponding files. With this information, step 407 can generate a list of files that correspond to the matching inodes.

Note that if the inodes are organized in chunks, then steps 402 can determine if another inode chunk is to be analyzed (i.e. an entire inode chunk can be read with a single request).

Step 403 can then scan the next inode chunk. If step 404 determines that an attribute in the meta data of any inode in that inode chunk matches the desired attribute, then step 405 can add any such inode to the attribute specific inode map.

Further note that the above-described inode chunks can be formed in anticipation of usage. Therefore, an inode chunk can have a bitmap indicating which inodes are actually in use. By using this bitmap in step 403, the reading of unused inodes (or even the whole chunk) can be avoided.

In one embodiment, an attribute specific inode map can be implemented using a bitmap where each inode is represented by a bit indexed by its inode number. Note that the search can include any set of attributes. Thus, for example, attributes including files modified since last week, files owned by Susan, and files having permissions including both Bob and Susan could be used to form an attribute specific inode map. Note that the inode numbers in the attribute specific inode map can then be further sorted or hashed to increase already fast access.

Figure 1:
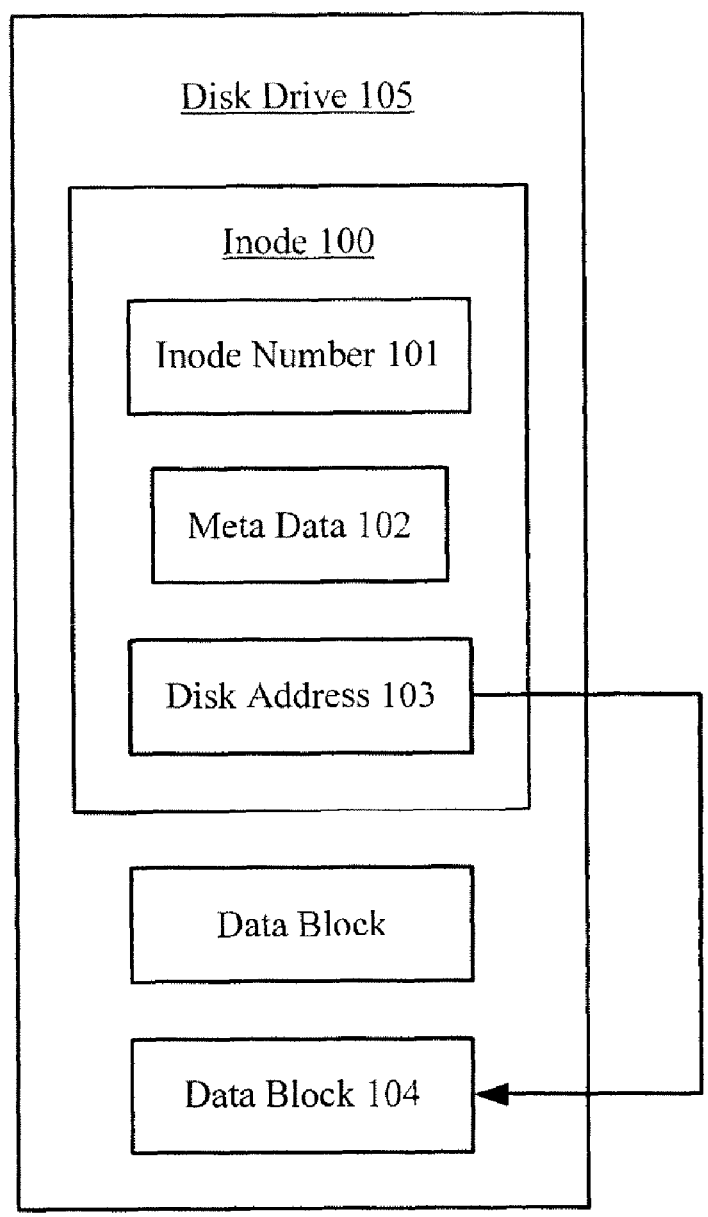
FIG. 1 illustrates a simplified inode that identifies its inode number and includes meta data as well as a disk address.
Figure 2:
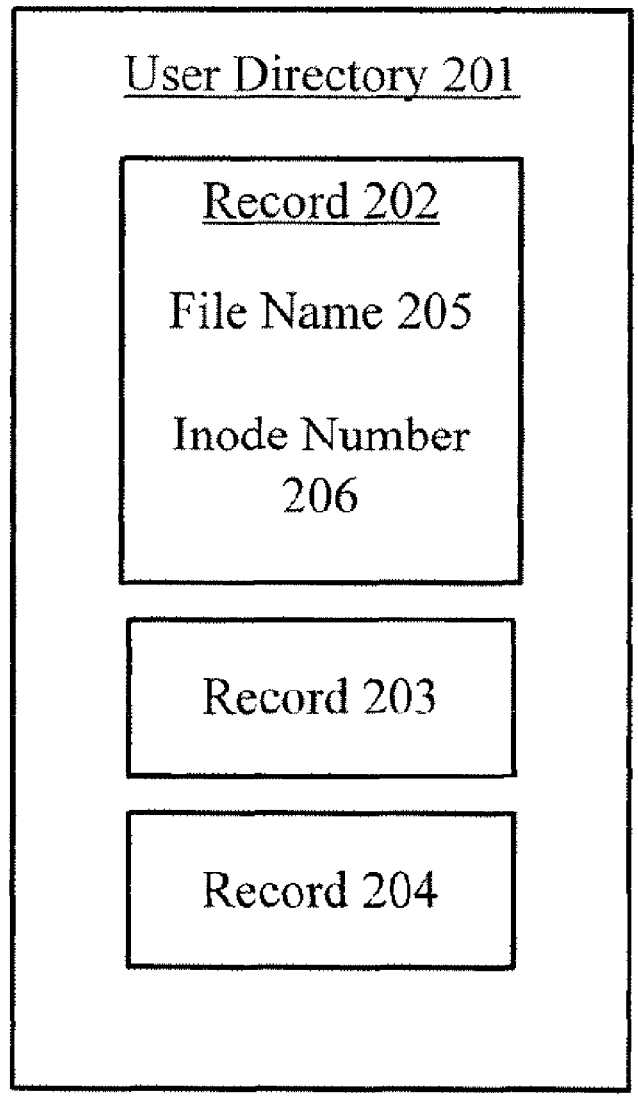
FIG. 2 illustrates a simplified user directory including a plurality of file records.
Figure 3:
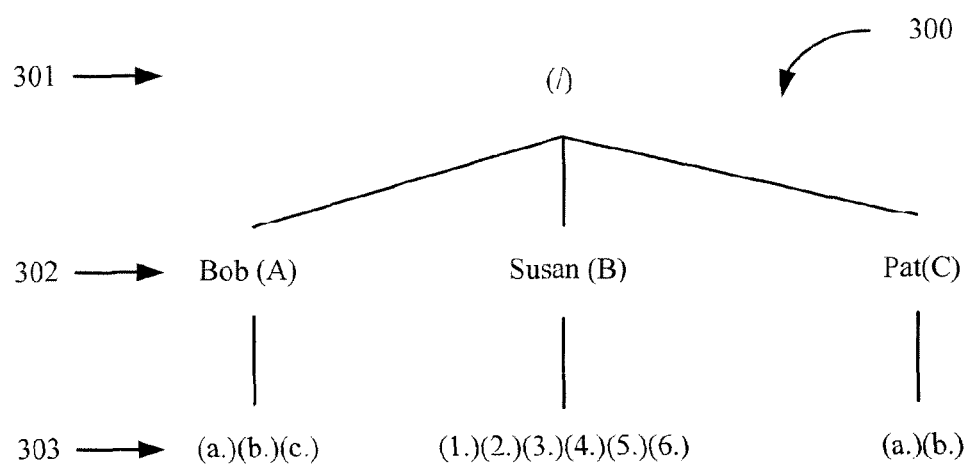
FIG. 3 illustrates a simple file tree.
Figure 5:
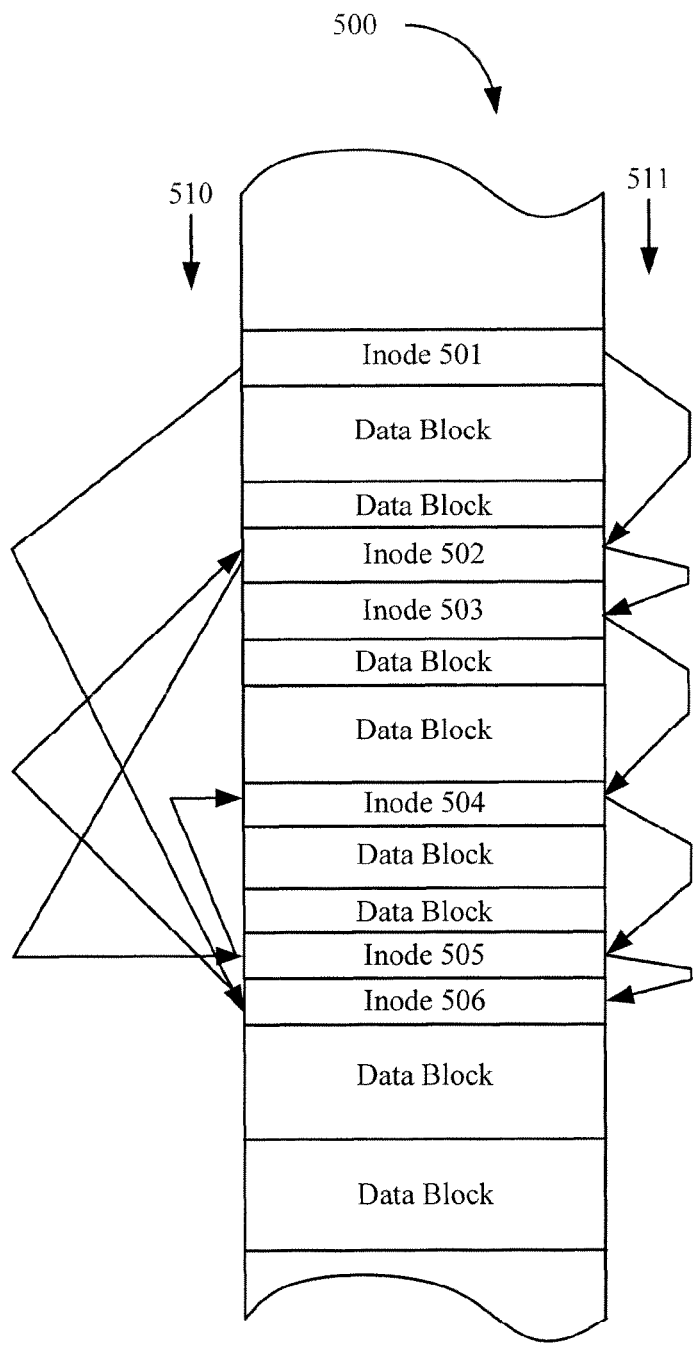
FIG. 5 illustrates a simplified disk drive (or file system image) that can be read using two search patterns: the first pattern is based on a random access of inodes whereas the second pattern is based on a sequential access of inodes.

The use of the attribute specific inode map can dramatically reduce the search time of the data storage system. For example, FIG. 5 illustrates a simplified disk drive 500 storing a plurality of inodes 501-506. (Note that FIG. 5 could also represent a file system image of the disk drive.) A search pattern 510 represents an exemplary read operation of disk drive 500 using the conventional technique. As previously described in reference to FIG. 3, read pattern 510 is based on the next inode being analyzed in the file tree, not the inode's location on disk drive 500. In this case, read pattern 510 analyzes inodes in the following order: 501, 506, 502, 505, and 504.

In contrast, a read pattern 511 represents an exemplary read for generating an attribute specific inode map, as discussed in reference to FIG. 4. Read pattern 511 is based on the inode's location on disk drive 500. In this case, the read operation can analyze inodes in the following order: 501, 502, 503, 504, 505, and 506. Note that the inode numbers associated with inodes 501-506 may not be sequential, nor is it important to this example. Specifically, read pattern 511 is performed sequentially (physically, not necessarily numerically) along disk drive 500.

Notably, read pattern 510, although having the same number of reads (assuming that inode chunks are not read as described in reference to FIG. 4), is performed randomly along disk drive 500. Note that read pattern 511 could have a limited number of random reads due to the reading of various directories at the root and branch levels. However, generating the attribute specific inode map with a large data storage system could advantageously result in 90% of the reads being sequential and only 10% of the reads being random.

Therefore, read pattern 511 has considerably less latency than conventional read pattern 510, thereby dramatically reducing the total read time of the inodes. Note that disk drive 500 (or its corresponding file system image) is illustrative of the above-described read patterns, not exemplary of actual disk drives (or file system images). Specifically, a typical file system includes many more files (e.g. emails) than users. Therefore, there are generally very few directories compared to files. That is, disk drive 500 (or its corresponding file system image) could have very large data blocks separating inodes (or inode chunks). As a result, the difference between reading inodes using conventional pattern 510 versus new pattern 511 can be further appreciated. For example, an attribute search taking 45 minutes using a conventional file tree walk can be reduced to 1 minute using the attribute specific inode map technique.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method comprising:
    searching for matching files by performing a physically sequential scan of inodes in a file system image of a data storage device to read meta data attributes of the inodes, the scan being performed according to a physically sequential read pattern along the data storage device, the inodes in the file system image being stored such that the numerical order of the inodes differs from the physical ordering of the inodes in the file system image;
    comparing the meta data attributes of the scanned inodes to specified attribute criteria defining the matching files; and
    building a list of scanned inodes in the file system image whose meta data attributes match the specified attribute criteria, wherein the list includes a bitmap where each inode is represented by a bit indexed by its inode number.

2. The method of claim 1, wherein the inodes are organized in chunks, further comprising forming the chunks in anticipation of usage.

3. The method of claim 1, further comprising forming an inode chunk having a bitmap indicating which inodes are actually in use, wherein the reading of unused inodes can be avoided using the bitmap.

4. The method of claim 1, further comprising:
    walking a file tree of the data storage device to find inodes in the file tree that match the inodes in the list; and
    generating a list of the matching files that correspond to matching inodes.

5. A method comprising:
    searching for matching files by performing a physically sequential scan of inodes in a data storage device to read meta data attributes of the inodes, the scan being performed according to a physically sequential read pattern along the data storage device, the inodes in the data storage device being stored such that the numerical order of the inodes differs from the physical ordering of the inodes in the data storage device;
    comparing the meta data attributes of the scanned inodes to specified attribute criteria defining the matching files; and
    building a list of scanned inodes on the data storage device whose meta data attributes match the specified attribute criteria, wherein the list includes a bitmap where each inode is represented by a bit indexed by its inode number.

6. The method of claim 5, wherein the inodes are organized in chunks, further comprising forming the chunks in anticipation of usage.

7. The method of claim 5, further comprising forming an inode chunk having a bitmap indicating which inodes are actually in use, wherein the reading of unused inodes can be avoided using the bitmap.

8. The method of claim 5, further comprising:
    walking a file tree of the data storage device to find inodes in the file tree that match the inodes in the list; and
    generating a list of the matching files that correspond to matching inodes.

9. A method comprising:
    generating a file system image of the data storage system;
    searching for matching files by performing a physically sequential scan of inodes in the file system image to read meta data attributes of the inodes, the scan being performed according to a physically sequential read pattern along the file system image, the inodes in the file system image being stored such that the numerical order of the inodes differs from the physical ordering of the inodes in the file system image;
    comparing the meta data attributes of the scanned inodes to specified attribute criteria defining the matching files;
    building a list of scanned inodes on the file system image whose meta data attributes match the specified attribute criteria;
    walking a file tree of the data storage system to find inodes in the file tree that match the inodes in the list; and
    generating a list of the matching files that correspond to matching inodes.

10. The method of claim 9, wherein the list includes a bitmap where each inode is represented by a bit indexed by its inode number.

11. The method of claim 9, wherein the inodes are organized in chunks, further comprising forming the chunks in anticipation of usage.

12. The method of claim 9, further comprising forming an inode chunk having a bitmap indicating which inodes are actually in use, wherein the reading of unused inodes can be avoided using the bitmap.

13. A method comprising:
    searching for matching files by performing a physically sequential scan of inodes in a data storage system to read meta data attributes of the inodes, the scan being performed according to a physically sequential read pattern along the data storage system, the inodes in the data storage system being stored such that the numerical order of the inodes differs from the physical ordering of the inodes in the data storage system;
    comparing the meta data attributes of the inodes to specified attribute criteria defining the matching files;
    building a list of inodes on the data storage system whose meta data attributes match the specified attribute criteria;

walking a file tree of the data storage system to find inodes in the file tree that match the inodes in the list; and generating a list of the matching files that correspond to matching inodes.

14. The method of claim 13, wherein the list includes a bitmap where each inode is represented by a bit indexed by its inode number.

15. The method of claim 13, further comprising:

receiving a request for files created within a specified time frame;

determining the specified attribute criteria according to the request for files; and providing, responsive to the request, the list of the matching files corresponding to the matching inodes.

16. The method of claim 15, wherein the request for files includes a request for email messages.

17. A method comprising:

searching for matching files by performing a physically sequential scan of inodes in a memory of a data storage device to read meta data attributes of the inodes, the scan being performed according to a physically sequential read pattern along the memory of the data storage device, the inodes in the data storage device being stored such that the numerical order of the inodes differs from the physical ordering of the inodes in the data storage device;

building a list of scanned inodes on the data storage device whose meta data attributes match specified attribute criteria;

walking a file tree of the data storage device to find inodes in the file tree that match the inodes in the list; and generating a list of the matching files that correspond to matching inodes.

\* \* \* \* \*